United States Patent
Ramappa et al.

(10) Patent No.: US 10,131,757 B2
(45) Date of Patent: Nov. 20, 2018

(54) METHODS FOR SURFACE MODIFICATION OF MATERIALS

(71) Applicant: QED Labs Inc., Waltham, MA (US)

(72) Inventors: Deepak Arabagatte Ramappa, Somerville, MA (US); Gangadhar Jogikalmath, Chestnut Hill, MA (US)

(73) Assignee: QED Labs, Inc., Waltham, MA (US)

( * ) Notice: Subject to any disclaimer, the term of this patent is extended or adjusted under 35 U.S.C. 154(b) by 9 days.

(21) Appl. No.: 15/481,615

(22) Filed: Apr. 7, 2017

(65) Prior Publication Data

US 2017/0267815 A1 Sep. 21, 2017

Related U.S. Application Data

(63) Continuation of application No. PCT/US2015/021980, filed on Mar. 23, 2015.

(60) Provisional application No. 62/060,764, filed on Oct. 7, 2014.

(51) Int. Cl.
| | | |
|---|---|---|
| *C08J 7/12* | (2006.01) | |
| *C09D 153/00* | (2006.01) | |
| *C08G 81/02* | (2006.01) | |
| *C08G 81/00* | (2006.01) | |
| *C08J 3/24* | (2006.01) | |
| *C09D 127/12* | (2006.01) | |
| *C08F 283/06* | (2006.01) | |

(52) U.S. Cl.
CPC ............. *C08J 7/12* (2013.01); *C08G 81/00* (2013.01); *C08G 81/025* (2013.01); *C08J 3/246* (2013.01); *C09D 153/005* (2013.01); C08J 2323/00 (2013.01); C08J 2377/06 (2013.01); C08J 2423/26 (2013.01); C08J 2453/00 (2013.01); C08J 2471/02 (2013.01)

(58) Field of Classification Search
CPC ....... C08L 27/12; C08L 27/18; C09D 127/12; C09D 127/18; C08G 81/024; C08G 81/025; C08J 3/246; C08J 7/12
USPC .......................... 525/191, 199, 200, 242, 404
See application file for complete search history.

(56) References Cited

U.S. PATENT DOCUMENTS

| | | | | |
|---|---|---|---|---|
| 4,079,084 | A * | 3/1978 | Houghton | ............ C08G 65/326 106/3 |
| 5,068,400 | A * | 11/1991 | Tanaka | .................... C07C 31/40 560/223 |
| 7,026,014 | B2 * | 4/2006 | Luzinov | ................... B05D 1/38 427/402 |
| 2003/0166785 | A1 | 9/2003 | Medsker et al. | |
| 2012/0296029 | A1 | 11/2012 | Liu et al. | |
| 2013/0258467 | A1 | 10/2013 | Shiraiwa et al. | |

FOREIGN PATENT DOCUMENTS

WO 2005047358 5/2005

OTHER PUBLICATIONS

ISA/US, International Search Report for PCT/US2015/021980 dated Jun. 22, 2015.
ISA/US, Written Opinion of the International Searching Authority for PCT/US2015/021980 dated Jun. 22, 2015.

\* cited by examiner

*Primary Examiner* — Fred M Teskin
(74) *Attorney, Agent, or Firm* — Hodgson Russ LLP

(57) ABSTRACT

The invention concerns methods and compositions for modifying a surface of a material by anchoring a surface modifying additive to a polymer matrix using an anchor molecule, wherein the surface modifying additive and the anchor molecule are both added to a melt phase of the polymer matrix.

18 Claims, No Drawings

METHODS FOR SURFACE MODIFICATION OF MATERIALS

CROSS REFERENCE TO RELATED APPLICATIONS

This application claims the benefit of U.S. application Ser. No. 62/060,764 filed Oct. 7, 2014, the contents of which are incorporated herein by reference in its entirety.

FIELD

The present disclosure relates to methods providing surface modification of polymeric materials as well as compositions and articles having such modifications.

BACKGROUND

Many polymeric substrates are hydrophobic and inert owing to their non-polar nature. For example, polymers that are olefinic can show high hydrophobicity. Some applications may require that the surfaces of polymeric substrates instead be hydrophilic. For example, surfaces used in microfluidics, surfaces of biological and medical devices, sensors, or other devices may need to be hydrophilic. In another example, tissue growth is encouraged on hydrophilic surfaces, which may or may not show biorecognizable moieties (such as RGD peptides, proteins, or other molecules or cells). In yet another example, battery separators made of olefins need to be wettable to efficiently fill the battery space with electrolyte.

In other embodiments it may be desirable to modify the surfaces of inert fibers with functional chemistry. For example, the surface of a polyolefin or other inert fibers may be treated with a flame retardant sheath that enables production of high mechanical strength fibers (i.e., no flame retardants in the core of the fiber) while the surface offers inhibitory action towards propagating flame. This could be desirable in cheap fabrics made of inexpensive polyolefins. Depending on the flame retardant or anchor used, this may render the fiber hydrophilic or hydrophobic.

It may also be desirable to have synthetic low cost fibers be surface modified to provide a better hand ("feel"), or the appearance of a natural fiber surface while the core is of a synthetic fiber. Hand is the quality of a fabric assessed by the reaction obtained from the sense of touch. Surface modification may be necessary to impart, for example, a certain hand of cotton to synthetic fibers. This could be accomplished by modifying the surfaces of synthetic fiber surfaces using a cellulosic derivative, which may render the fiber surfaces hydrophilic.

Surface modification could also be used to impart a superior hydrophobicity to synthetic polymer surfaces. Melt additives that segregate to surfaces and surface coatings that bind to melt additives at interfaces may be desired.

In other embodiments where it is desired to have a surface polymer or material of another type be hydrophilic, such as rendering a surface to be able to attract and attach itself to protein, the surface can be modified to exhibit such properties.

Rendering surfaces hydrophilic or hydrophobic or otherwise modifying the surface of a material can present challenges during manufacturing. Previous methods have applied a topical coating or some other material after the article is made, but this may be removed during, for example, use, wearing, or washing. New durable methods to modify the surface of a material are needed in the art.

BRIEF SUMMARY OF THE INVENTION

The invention concerns, inter alia, anchor molecules that have chemically similar characteristics to a polymer matrix and a surface modifying additive are combined to change surface chemistry of a polymer. This may, for example, render an article, such as a fabric, hydrophilic or hydrophobic.

In some aspects, the invention concerns methods for modifying a surface of a material comprising anchoring a surface modifying additive to a polymer matrix using an anchor molecule, wherein the surface modifying additive and the anchor molecule are both added to a melt phase of the polymer matrix. In some embodiments, the surface modifying additive has both hydrophobic blocks and hydrophilic blocks. One can modify or adjust the ratio of the hydrophobic blocks and the hydrophilic blocks to enable surface segregation of the surface modifying additive.

Some preferred embodiments concern a surface modifying additive comprises polytetrafluoroethylene and ethylene oxide blocks. The ethylene oxide blocks can comprise, for example, polyethylene glycol or polyethylene oxide. Some surface modifying additives comprise a fluorinated molecule, such as fluorinated polyetherdiol. In some embodiments this fluorinated polyetherdiol has ethylene oxide segments in a backbone and hydrophobic sidechains.

Any suitable anchor may be utilized. In some embodiments, the anchor molecule comprises maleated polypropylene.

The invention is useful in a variety of polymer matrices. In certain embodiments, the polymer matrix comprises polyolefins.

The surface of a surface of the material is rendered hydrophilic or hydrophobic depending on the composition of the surface modifying additive. Properties other than the hydrophilic or hydrophobic nature of a surface can be modified by the instant technology. For example, the lubricity of the surface of the material may be modified.

In some preferred embodiments, the surface modifying additive is uniformly distributed over a surface of the material.

Some aspects of the invention further concern (a) modifying metallic nanoparticles with the surface modifying additive; and (b) segregating the metallic nanoparticles to a surface of the material. In certain embodiments, the invention further concerns (a) modifying metallic nanoparticles with the surface modifying additive; (b) reacting the metallic nanoparticles with the anchor molecule; and (c) binding the metallic nanoparticles to the polymer matrix.

In some processes, the surface modifying additive and the anchor molecule are added separately to the polymer matrix.

In some aspects, the invention concerns articles formed using a method which comprises at least one method described herein.

In other aspects, the invention concerns surface modifying additives comprising (a) a polymer; (b) at least one hydrophilic block on the polymer; and (c) at least one hydrophobic block on the polymer; wherein the polymer is configured to render an article hydrophilic. In some embodiments, the ratio of the at least one hydrophilic block to the at least one hydrophobic block is configured to enable surface segregation of the at least one hydrophilic block.

In certain embodiments, the surface modifying additive has a ratio of the at least one hydrophilic block to the at least one hydrophobic block is configured to render the article hydrophilic.

In some surface modifying additives, the at least one hydrophobic block is fluorinated. In certain surface modifying additives, the at least one hydrophobic block is selected from the group consisting of polytetrafluoroethylene, a carboxy functionalized fluorinated compound, and an anhydride functionalized fluorinated compound. In some embodiments, the at least one hydrophobic block comprises trifluoroacetic anhydride or dodecafluoroheptanoyl chloride. In certain embodiments, the at least one hydrophilic block comprises ethylene oxide.

When fluorinated component is used, the surface modifying additive may have a fluorine content in a range of 15% to 46%. In certain embodiments, the surface modifying additive has a fluorine content in a range of 5% to 75%.

The invention also concerns methods and articles where the polymer matrix is an island in sea composite fiber and the surface modifying additive is anchored to the island. In some configurations the island in sea composite fiber comprises polypropylene and polyethylene glycol. In certain configurations the island in sea composite fiber further comprises a cellulosic molecule. One suitable cellulosic molecule is carboxymethylcellulose.

The surface modifying additive and the anchor molecule may each comprise one of a maleated polypropylene molecule and a maleic anhydride reactive molecule. In some embodiments, the maleic anhydride reactive molecule comprises one of an amine modified polyethylene glycol and a hydroxyl modified polyethylene glycol. In other embodiments, the surface modifying additive and said anchor molecule each comprise one of an anhydride modified polypropylene molecule and a species selected from the group consisting of an aminated protein, a peptide, and a sugar.

Some methods form articles by a process further comprising reacting the polymer matrix with a flame retardant molecule such as 9,10-dihydro-9-oxa-10-phosphaphenanthrene-10-oxide. The flame retardant molecule is the surface modifying additive in some compositions.

In some preferred embodiments, the anchor molecule is chemically compatible with said polymer matrix and may have chemically similar characteristics to the polymer matrix.

Methods, articles and compositions of the invention may optionally utilize one or more materials selected from flame retardants, dye, UV absorbent agents, heat stabilizers, and sheath forming agents. These materials, may in some embodiments, be the surface modifying material.

Some surface modifying additives comprise a fluorinated molecule. Some surface modifying additives further comprise a hydroxyl group.

In some preferred embodiments, the surface modifying additive and the anchor molecule are part of a single molecule. In certain embodiments, the surface modifying additive and the anchor molecule are attached in the single molecule using at least one of covalent, electrostatic, or van der Waals interactions. In some embodiments, the anchor molecule comprises an oligomeric chain or a polymeric chain and the anchor molecule has a reactive functional group. Reactive functional groups include amine, epoxy, anhydride, isocyanate, hydroxyl, carboxyl, and acid chloride.

Some anchor molecules comprise one or more of polyolefin, polyester, a polyamide, styrenic polymer, vinyl polymer, or a combination or copolymers thereof.

Certain surface modifying additives are a derivative of polyethyleneoxide with a functional group that is also present on the anchor molecule.

In some embodiments, the polymer matrix is an island in sea composite fiber and said surface modifying additive is anchored to said island. The island in sea composite fiber may comprise polypropylene and polyethylene glycol. In some embodiments, the island in sea composite fiber further comprises a cellulosic molecule. One preferred cellulosic molecule comprises carboxymethyl cellulose. In certain embodiments, the surface modifying additive and said anchor molecule each comprise one of a maleated polypropylene molecule and a maleic anhydride reactive molecule. The maleic anhydride reactive molecule may comprise an amine modified polyethylene glycol or a hydroxyl modified polyethylene glycol. In some embodiments, the surface modifying additive and said anchor molecule each comprise one of an anhydride modified polypropylene molecule and a species selected from the group consisting of an aminated protein, a peptide, and a sugar.

DETAILED DESCRIPTION OF THE INVENTION

The present disclosure describes use of in-situ surface chemistry involving surface segregating or interfacially segregated reactive molecules that are capable of anchoring desired molecules at the interface or surface and, in turn, are anchored to a polymer matrix of an article or finished product, and may be stably and uniformly distributed at the surface/interface, though other distributions are possible. This interlocking or anchoring of the surface modification entity only at the surface can help offset the loss in mechanical properties of the finished polymer product wherein the core of the product is unadulterated by any incompatible surface segregating additive.

Anchored surface modifying molecules can be added to the melt during manufacturing to yield a surface-modified article. This surface-modified article may be fabricated using injection molding, extrusion, casting, fiber spinning, or other methods known to those skilled in the art. Thus, a polymeric articles can be surface modified via melt phase addition of a surface-modifying entity and stabilization of the surface-modifying entity at the interface. This may prevent wash-off (in the case of fabrics), evaporation, sloughing off, or other removal.

In some embodiments, the surface segregating or interfacially segregated reactive molecules could be one single molecule that contains two components attached to each other via either covalent, electrostatic or van der Waals interactions prior to addition into the polymer matrix. One part of the additive is an anchor molecule (or anchor) that has chemically similar characteristic as the polymer matrix while the other part is the surface modifying additive, such as a fluorinated molecule. The anchor and surface modifying additive can also be separate molecules. In other embodiments, the surface modifying additive may be reacted or bound to an anchor during the process of adding the surface modifying additive to the polymer article. In these embodiments, both the anchor and the surface modifying additive may be separately added during processing of the polymer into a final article.

The anchors may be tuned to the chemical environment of the polymer article. For example, the anchors may have a substantially similar chemical structure as that of the polymer matrix and/or be compatible with the polymer. The anchor and the surface modifying additive combination conjugate may be a separate entity from the polymer allowing the final product to be easily recycled. This also allows a new product produced from the recycled product to maintain the surface modifying additive and possess the surface modifying additive properties of the original article.

The anchor molecules may be polymeric or oligomeric molecules which have reactive functional groups. These may be water insoluble polymers such as polyethylene with functional groups such as, for example, amines, epoxy, anhydride, isocyanate, hydroxyl, carboxyl, or acid chloride. The anchor molecule also could be polyolefins, polyesters, polyamides, styrenics, vinyl polymers, or copolymers of these entities functionalized with any of the above functional groups or other functional groups. The surface modifying additives may be derivatives of water soluble polymers such as polyethyleneoxide which contain functional groups that are reactive groups present on the anchor group. Such pairings include but are not limited to epoxy-amine, epoxy-anhydride, anhydride-hydroxyl, anhydride-amine, amine-isocyanate, hydroxyl-isocyanate, or acid chloride-amine. The anchor may be made of the same chemical structure as the matrix while the surface modifying entity may be chemically different from the matrix.

Most methods disclosed herein disclose additives that can be added to a melt, the result of which is that surface modification is done in-situ. No secondary processes may be necessary for surface modification. Such embodiments reduce the need for secondary processes such as topical treatments applied to fabrics that have already been manufactured.

The surface modified fabrics may be used for clothing, protective gear, biological devices, medical devices, or other applications.

Hydrophilicity Improvement of "Islands in Sea" Fibers

The "Islands in Sea" type composite fibers comprise a sea part containing an easily-soluble polymer and multitudes of island parts containing an insoluble or sparingly soluble polymer (i.e., the island parts are less soluble than the sea part). The island fibers are separated from the sea by dissolving away the sea. These fibers are made, for example, using a melt spinning technique such as with a spinneret. Polypropylene and polyethylene glycol (PEG) form one suitable pair to produce island in sea fibers, though other pairs are possible.

In other examples, the sea parts may be a polymer that is easily soluble in aqueous alkali solutions such as polylactic acid, polyalkyleneoxide-based polymers and co-polymers (which may have high molecular weights), copolymerized polyesters, and copolymerized polyesters of polyethylene glycol compounds with 5-sodium sulfoisophthalic acid. The island parts may be, for example, a water dissolvable polymer or aqueous solution dissolvable polymer such as polyolefins, polyesters, polyamides, acrylics, styrenics, their copolymers, acetals, or other hydrophobic polymers.

In one embodiment, the surface of the island fibers can be modified by the interfacial reaction of an additive system. A reactive anchor molecule may be added to the island polymer and a corresponding molecule (i.e., the surface modifying additive) capable of reacting with the anchor is added to the sea polymer such that the two meet at the interface between the island and the sea polymers and initiate reaction. The anchor locks the surface modifying additive to the surface of the fiber and upon washing the sea away, the additive system is locked to the surface of the fiber.

In an example, polypropylene and PEG are used to produce island in sea fibers. Polypropylene forms the island or insoluble phase while the PEG forms the soluble phase. A maleated (maleic anhydride modified) polypropylene molecule can be added in small proportion to the polypropylene polymer matrix while a maleic anhydride reactive molecule such as amine modified or hydroxyl modified PEG can be added to the PEG sea matrix. In this example, the maleated molecule is the anchor and the PEG-amine molecule is the surface modifying additive. The maleated polypropylene, owing to the polar maleic anhydride group, orients itself to face the PEG sea during fiber formation. When this happens, the maleic anhydride has a high chance of encountering an aminated or hydroxylated PEG molecule. The anhydrous melt conditions provide a suitable environment for the reaction between maleated polypropylene and aminated (or hydroxylated) PEG molecule thus locking the PEG molecule to the interface of the fiber and the surrounding polymer. When the PEG sea is washed away, the resulting polypropylene fibers are modified with a bound layer of PEG which is more difficult to wash off.

Other possible surface modifying moieties using anchor and surface modifying additives could include a reaction of an anhydride modified polypropylene molecule with aminated proteins, peptides, sugars, or other molecules or compounds to provide a hydrophilic surface with a biorecognizable interface. Other surface modifying additives could be hydrophobic molecules such as fluorinated molecules with functional groups that can react with anchor functional group. The surface modifying additives also may be flame retardants, dyes, UV absorbent agents, heat stabilizers, or sheath forming agents that impart properties such as lubricity (increasing or reducing friction) or stain resistance.

Reactive anhydride or epoxy modified polypropylene surfaces can be reacted with cellulose to provide a cellulose-like or cotton-like surface for synthetic fibers. In one example, a maleated polypropylene molecule (such as Fusabond® series from DuPont) can be added to the island phase of polypropylene homopolymer and a corresponding cellulosic molecule such as carboxymethylcellulose (CMC) can form the sea polymer. Cellulosic molecules may be, for example, carbohydrates or sugar molecules. The carbohydrate may be insoluble in water, such as cellulose or hemicellulose. The interfacially segregated anhydride group of the maleated-polypropylene reacts with the hydroxyl groups on the cellulosic molecule thus locking it to the fiber surface and providing a cotton-like natural surface to a synthetic fiber.

The anchor may be, for example, polyester, polylactic acid, polyamides, polystyrene, polyethylene, polyvinyl alcohol, or another species that is readily soluble. As an example of the readily soluble ingredient, copolyester is readily soluble in hot water or aqueous solvents, polylactic acid and polyvinyl alcohol. Copolyester was co-polymerized with polyethylene glycol and sodium sulfoisophthalate. From the viewpoint of spinning, polylactic acid and polyester dissolve easily in an aqueous solvent of low concentration. Further, from the viewpoint of the open superfine fiber removal properties and sea occurs, polyesters sodium sulfoisophthalate copolymerized alone may be beneficial.

Hydrophobicity Improvement in Synthetic Fibers

In another embodiment, the anchor/surface modifying additive reactive system could be used to surface modify synthetic polymer surfaces with a hydrophobic group. This would be an advantageous system for producing stain and water repellant fabrics. The additive could be made by pre-reacting an anchor and a surface modifying additive in an extruder and then adding the conjugate at a small proportion to the matrix of the polymer to be surface modified. In one example, a fluorinated molecule containing hydroxyls was pre-reacted with a maleated polypropylene molecule resulting in an ester linkage between the two. This additive was then melt compounded with the polypropylene matrix. The fluorinated molecule tends to surface segregate due to its low surface energy while being bound by the polypropylene anchor which is entangled in the polypropylene matrix.

A reactive anhydride modified polypropylene surface can also be reacted with flame retardant (FR) molecules, such as, for example, an epoxy-modified molecule such as 9,10-dihydro-9-oxa-10-phosphaphenanthrene-10-oxide (DOPO) or other molecules, to provide a covalently immobilized FR sheathing around the fibers.

The compositions may include one or more surface modifying molecules reacted with one or more anchors, such as, oligomeric or polymeric chains having a reactive functional group, such as an epoxy functional group, a hydroxyl functional group, or anhydride. Carboxyl, amine or combinations thereof, contained therein, form a surface modifying additive. The surface modifying additive may be incorporated into a polymer matrix and used to impart hydrophilic, hydrophobic, biocompatible or biorecognizable properties to a final products, such as paints, textiles, coatings, and other articles.

The anchors allow for increased dispersion of the surface modifying molecule within the polymer matrix of the article, and also enable high loadings while minimizing adverse impacts to the mechanical properties of the article due to entanglement of the anchor or tail with the polymer matrix of the article.

Hydrophilic Surface Creation

Hydrophilic surfaces also can be created on an article using surface modifying additives that have both hydrophilic and hydrophobic blocks. The hydrophobic blocks have affinity to the air-polymer interface (i.e., tend to surface segregate). On the other hand, hydrophilic blocks, owing to their high surface energy, tend to be buried below the air-polymer interface and are typically unavailable to surface modify the polymeric substrate, article, or polymer matrix to which they are added to.

Hydrophobic blocks tend to surface segregate and hydrophilic blocks tend to remain buried due to surface energy differences. Thermodynamically, any surface wants to minimize surface energy. So when two dissimilar materials (in terms of surface energy or surface tension) are mixed together, the material with the least surface tension (or surface energy), such as the hydrophobic blocks, tends to populate the interface with air. This results in the higher energy component, such as the hydrophilic blocks, being pushed into the interior of the article.

By combining hydrophobic blocks and hydrophilic blocks into a surface modifying additive, enough driving force can be generated by the hydrophobic blocks to cause surface segregation of the surface modifying additive such that the attached hydrophilic blocks are brought to the interface as well. In one example, hydrophobic fluorinated groups, such as those present in polytetrafluoroethylene (PTFE), are attached to hydrophilic ethylene oxide blocks, such as the blocks present in polyethylene glycol or highly water soluble polyethylene oxide. By varying the ratio of the two blocks, one can design a hydrophilic surface modifying additive capable of surface segregation and transforming the surface of a hydrophobic polymer into a wettable surface.

This process works with molecules that have fluorine content in the range of approximately 15% to 46%. This process also may work with molecules containing fluorinated species with % F in a range of approximately 5% to 75%. The higher % F containing molecules would be less hydrophilic than the molecules containing lower % F. The fluorine content or % F is measured in weight/weight (w/w).

Even if such surface modifying additives can surface segregate to the surface, these surface modifying additives can be washed away if not anchored to the polymer matrix to which they are added. Thus, surface modifying additives are anchored to the polymer matrix to prevent such surface erosion.

In one example, fluorinated polyetherdiols, such as PolyFox® from Omnova, are used as surface modifying additives. These polymers are made of hydrophilic backbones consisting of ethylene oxide segments and hydrophobic sidechains. The polymer intermediates have end hydroxyl groups which can be reacted with suitable anchors. In one example, a maleated polypropylene molecule (such as GR204 Amplify from Dow) is used as an anchor molecule and can be reacted with the PolyFox PF-7002 polyetherdiol to create an anchored surface modifier for use with a polyolefin matrix. The polypropylene anchor is chemically compatible with the polyolefin backbone while the PolyFox additive is capable of surface segregation.

In another example, reactive polyethers such as Jeffamine® molecules (Huntsman) can be reacted with carboxy or anhydride functionalized fluorinated compounds such as trifluoroacetic anhydride or dodecafluoroheptanoyl chloride to yield fluorinated polyether molecules. Such molecules have the ability to surface segregate in a polymeric matrix due to the presence of fluorinated species while providing hydrophilic character due to the polyether blocks.

In yet another example, hydrophilic monomers such as hydroxypropylmethacrylate are copolymerized with vinyl monomers containing fluorinated groups such as 2-(perfluorohexyl)ethyl acrylate to result in polymers with both hydrophobic and hydrophilic domains.

Metallic Barrier Layers for Synthetic Surfaces

The anchor/surface modifying additive reactive system could be used to surface modify synthetic polymer surfaces with a metallic nanoparticles. Synthetic fibers may need to be plated in a secondary operation to obtain metallic surfaces for synthetic polymer articles. There exists a need for a melt additive that can prepare such metallic layers on synthetic polymer surfaces. This can be accomplished by modifying metallic nanoparticles with a surface modifying additive. In one instance, metallic nanoparticles can be reacted with a fluorinated polymer or oligomer and be added to the melt of a polyester. When fibers are spun, the metallic particle is dragged to the surface due to the fluorinated molecule surface segregating due to its lower surface energy. In another embodiment, the metallic nanoparticle could be modified with functional groups that are reactive with anchor molecules. In island-sea fibers, the metallic nanoparticles could be added to the sea phase such that it reacts with the functional groups of the anchor molecule at the interface. When the sea phase is washed away, the metal particles are found bound to the polymer surface anchored to the matrix.

Some of the metallic nanoparticles with additional functionality include: Fe-based and/or Co-based and/or Ni-based nanoparticles (which may be used for magnetic applications), copper-based nanoparticles (which may be used for conductivity-based applications), silver-based nanoparticles (which may be used for antimicrobial, conductivity, or heat transfer applications), titanium-based nanoparticles (which may be used for pigmentation or UV protection), or ZnO-based nanoparticles (which may be used for UV protection). The metallic nanoparticles also may be Sn, Pb, W, or Ta based, which may be used as a lithium binding site for electrode applications. The metallic nanoparticles also may be Si, Ge, or GaAs based, which may be used in semiconductor, light-emitting diodes, or solar applications. The metallic nanoparticles also may be InGaAs, InP, GaP, GaN, ZnS, CdSe, FeS based, which may be used for quantum dots and fluorescence based applications. Of course, the metallic nanoparticles also may be other materials known to those skilled in the art.

The metallic nanoparticles may have dimensions from a few nanometers to a few hundred microns. In one example, the metallic nanoparticles range in dimension from approximately 10 nm to approximately 10 microns.

Anti-Drip Flame Retardant Fabrics

Fabrics made of polyethylene terephthalate (PET) and nylon can suffer from the problem of melt dripping when aflame. The melt drips cause grievous injuries to people wearing them. Though flame retardant systems are used in PET and in nylon, none of them have been able to successfully reduce or stop melt dripping. Described here are embodiments that can be used to reduce or eliminate melt drips when fabrics or articles made of PET and nylon encounter flame.

In one embodiment, crosslinking of a reactive component added to the fiber spinning melt is encouraged to form an interpenetrating network with the nylon matrix. The crosslinking enhances the viscosity of the material when aflame, potentially reducing the melt drips.

In one embodiment, Elvamide® nylon multipolymers from DuPont are added as an additive to the nylon melt during fiber spinning. In epoxy crosslinker such as diglycidyl ether of polyethyleneoxide is used to crosslink the Elvamide® molecules. In another embodiment, epoxy modified DOPO flame retardant molecules from Struktol can be used to modify some of the amines thereby imparting further flame retardancy and an ability for char formation. The DOPO may be a surface modifying additive used with an anchor. This embodiment is not limited to nylons but can also be applied to other thermoplastic fibers such as PET by selecting appropriate reactive molecules. With Elvamide or similar nylon polymers that contain COOH and NH2 functionalities, multifunctional crosslinkers (that may contain at least two functional groups) that may contain epoxy, anhydride, amine, isocyanate, or hydroxyl can be used to create crosslinked networks. Other groups or species also may be contained in the crosslinker and the crosslinkers are not limited merely to those examples herein.

In another embodiment, crosslinking can be brought about between merging melt fronts such as those encountered in bicomponent fibers. These fibers are made by mixing two dissimilar materials in the spinneret head to create fibers with two different materials joined together in many different shapes. This technique can be exploited to create cross-linked fibers. In one example, two streams of Nylon polymer melts, one containing an Elvamide® nylon resin and the other containing a bifunctional crosslinker such as diglycidyl ether of PEG are brought together a bicomponent fiber, both made of PET. When the melt fronts meet, the reactive molecules react with one another forming crosslinks where the melt fronts meet resulting in enhanced resistance to melt dripping in the case of a fire.

The techniques and embodiments discussed here are not only applicable to melts but also to solvent phase processes such as fiber spinning from a "dope" (polymer solution), membrane and hollow fiber production from polymer precipitation or other processes.

The anchor molecules may be chemically similar to the polymer matrix. For example, the Elvamide molecules are chemically similar to polyamide matrix molecules (such as nylon) but they possess functionality that defines them as anchor molecules. The Elvamide molecules are crosslinked with a simple crosslinker or a more importantly a flame retardant crosslinker (such as epoxy modified DOPO) that provides an anti-drip functionality to the polyamide matrix material.

Any flame retardant that can be functionalized with groups capable of crosslinking anchor molecules would be suitable in the examples disclosed herein. DOPO is merely an example.

What is claimed:

1. A method for modifying a surface of a material comprising anchoring a surface modifying additive to a polymer matrix using an anchor molecule, wherein the surface modifying additive and the anchor molecule are both added separately to a melt phase of the polymer matrix.

2. The method of claim 1, wherein the surface modifying additive has both hydrophobic blocks and hydrophilic blocks.

3. The method of claim 2, wherein a ratio of the hydrophobic blocks and the hydrophilic blocks enables surface segregation of the surface modifying additive.

4. The method of claim 1, wherein the surface modifying additive comprises polytetrafluoroethylene and ethylene oxide blocks.

5. The method of claim 4, wherein the ethylene oxide blocks comprise polyethylene glycol or polyethylene oxide.

6. The method of claim 1, wherein the surface modifying additive comprises a fluorinated polyetherdiol having ethylene oxide segments in a backbone and hydrophobic sidechains.

7. The method of claim 6, wherein the anchor molecule comprises maleated polypropylene.

8. The method of claim 7, wherein the polymer matrix comprises polyolefins.

9. The method of claim 1, wherein the surface modifying additive comprises a fluorinated polyether molecule.

10. The method of claim 1, wherein a surface of the material is rendered hydrophilic.

11. The method of claim 1, wherein a surface of the material is rendered hydrophobic.

12. The method of claim 1, wherein the lubricity of the surface of the material is modified.

13. The method of claim 1, wherein the surface modifying additive is uniformly distributed over a surface of the material.

14. The method of claim 1, further comprising:
modifying metallic nanoparticles with the surface modifying additive; and
segregating the metallic nanoparticles to a surface of the material.

15. The method of claim 1, further comprising:
modifying metallic nanoparticles with the surface modifying additive;
reacting the metallic nanoparticles with the anchor molecule; and
binding the metallic nanoparticles to the polymer matrix.

16. A surface modifying additive comprising
a polymer;

at least one hydrophilic block on the polymer, wherein the at least one hydrophilic block is hydroxypropylmethacrylate, polyethylene glycol, polyethylene oxide, or combinations thereof; and at least one hydrophobic block on the polymer, wherein the at least one hydrophobic block is a fluorinated aliphatic group or moiety having a fluorine content of 15% to 46%, and wherein the at least one hydrophobic block comprises trifluoroacetic anhydride or dodecafluoroheptanoyl chloride; and wherein the polymer is configured to render an article hydrophilic.

17. The surface modifying additive of claim 16, wherein a ratio of the at least one hydrophilic block to the at least one hydrophobic block is configured to enable surface segregation of the at least one hydrophilic block.

18. The surface modifying additive of claim 16, wherein a ratio of the at least one hydrophilic block to the at least one hydrophobic block is configured to render the article hydrophilic.

* * * * *